United States Patent
Lindholm et al.

(10) Patent No.: US 9,560,509 B2
(45) Date of Patent: Jan. 31, 2017

(54) EMERGENCY SIGNALLING IN AN IP MULTIMEDIA SUBSYSTEM NETWORK

(71) Applicant: TELEFONAKTIEBOLAGET L M ERICSSON (PUBL), Stockholm (SE)

(72) Inventors: Fredrik Lindholm, Stockholm (SE); Per Öberg, Nacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/674,685

(22) Filed: Mar. 31, 2015

(65) Prior Publication Data

US 2015/0208224 A1 Jul. 23, 2015

Related U.S. Application Data

(63) Continuation of application No. 13/505,336, filed as application No. PCT/SE2009/064463 on Nov. 2, 2009, now Pat. No. 8,996,673.

(51) Int. Cl.
*H04L 29/06* (2006.01)
*H04W 76/00* (2009.01)
*H04W 4/22* (2009.01)

(52) U.S. Cl.
CPC ............ *H04W 4/22* (2013.01); *H04L 65/1016* (2013.01); *H04L 65/1069* (2013.01); *H04L 65/1073* (2013.01); *H04W 76/007* (2013.01)

(58) Field of Classification Search
CPC ... H04W 4/22; H04W 76/007; H04L 65/1016; H04L 65/1069; H04L 65/1006
See application file for complete search history.

(56) References Cited

U.S. PATENT DOCUMENTS

| 8,254,877 B2 * | 8/2012 | Edge .................... H04M 7/123 |
| | | 455/404.2 |
| 8,942,665 B2 * | 1/2015 | Patel ..................... H04W 4/22 |
| | | 455/404.1 |

(Continued)

FOREIGN PATENT DOCUMENTS

| JP | 2000-324532 A | 11/2000 |
| WO | WO 2009/100638 A1 | 8/2009 |
| WO | WO 2012106679 A2 * | 8/2012 ............. H04W 4/22 |

OTHER PUBLICATIONS

Deutsche Telekom: "Emergency session handling in special cases". 3GPP TSG-SA WG2 Meeting #75. S2-095075. Kyoto, Japan. Sep. 2009.

(Continued)

*Primary Examiner* — Uzma Alam

(57) ABSTRACT

A method and apparatus for handling emergency signalling in an IP Multimedia Subsystem network. A Proxy-Call Session Control Function receives a message requesting set up of a session. The message is associated with an IP Multimedia Private Identity. The P-CSCF determines that the message relates to an emergency call. If an emergency override tag associated with the IMPI is provisioned or set at the P-CSCF, then the message is forwarding the SIP message to a Serving-Call Session Control Function (S-CSCF) for further handling. However, if an emergency override tag associated with the IMPI is not provisioned or set at the P-CSCF, the message is forwarded to an Emergency-Call Session Control Function (E-CSCF). The invention allows the P-CSCF to exercise control over the handling of emergency signalling.

5 Claims, 6 Drawing Sheets

(56) References Cited

U.S. PATENT DOCUMENTS

| | | | | |
|---|---|---|---|---|
| 2004/0137873 | A1* | 7/2004 | Kauppinen | H04M 7/006 455/404.1 |
| 2005/0043008 | A1* | 2/2005 | Hurita | H04W 4/22 455/404.1 |
| 2005/0233727 | A1* | 10/2005 | Poikselka | H04W 4/02 455/404.2 |
| 2007/0060097 | A1* | 3/2007 | Edge | H04L 65/4007 455/404.1 |
| 2007/0097967 | A1* | 5/2007 | Kauppinen | H04M 7/006 370/389 |
| 2008/0008157 | A1 | 1/2008 | Edge et al. | |
| 2008/0310599 | A1* | 12/2008 | Purnadi | H04M 3/5116 379/37 |
| 2009/0191841 | A1* | 7/2009 | Edge | H04M 7/123 455/404.1 |
| 2010/0014508 | A1* | 1/2010 | Yang | H04M 7/0057 370/352 |
| 2010/0232403 | A1* | 9/2010 | Qiu | H04M 11/04 370/338 |
| 2011/0032931 | A1* | 2/2011 | Zhu | H04W 76/027 370/357 |
| 2011/0140179 | A1* | 6/2011 | Kusunoki | H01L 27/0629 257/256 |
| 2011/0230195 | A1* | 9/2011 | Li | H04W 4/02 455/445 |
| 2012/0218920 | A1* | 8/2012 | Varga | H04W 4/22 370/259 |
| 2013/0309993 | A1* | 11/2013 | Nishida | H04M 11/04 455/404.1 |

OTHER PUBLICATIONS $3^{rd}$ Generation Partnership Project; Technical Specification Group Services and System Aspects; IP Multimedia Subsystem (IMA) emergency sessions (Release 9). 3GPP TS 23.167. v9.2.0 (Sep. 2009).

* cited by examiner

EMERGENCY SIGNALLING IN AN IP MULTIMEDIA SUBSYSTEM NETWORK

PRIORITY CLAIM

This application is a continuation application of patented U.S. patent application Ser. No. 13/505,336 filed on May 1, 2012 (U.S. Pat. No. 8,996,673 to be issued Mar. 31, 2015), which is a U.S. National Application filed under 35 U.S.C. 371 of International Application No. PCT/EP2009/064463 filed on Nov. 2, 2009. The contents of this document are hereby incorporated by reference herein

TECHNICAL FIELD

The invention relates to the field of emergency signalling in an IP Multimedia Subsystem network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1a control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality.

When an emergency call is placed using a UE, it is normally routed from the P-CSCF to and Emergency CSCF (E-CSCF). The E-CSCF is concerned only with handling emergency calls. The E-CSCF must determine the most appropriate Public Safety Answering Point (PSAP), for example the nearest emergency services call centre, and forwards emergency INVITE messages to the PSAP. The E-CSCF is attached to a Location Retrieval Function (LRF), which allows it to determine the location of the calling UE.

In some circumstance it may be necessary to route an emergency call via the S-CSCF. This is the case where, for example, a security association has not been established between the P-CSCF and the UE at registration, and the local emergency authorities do not accept emergency calls that have not been authenticated. This is discussed in 3GPP TSG-SA WG2 S2-095075. Where there is no security association, the S-CSCF performs a SIP-digest authentication for every dialogue. The Emergency session is therefore sent via the S-CSCF, which queries the UE's credentials. Another scenario in which the emergency call might be routed via the S-CSCF is where either the S-CSCF or an AS needs to perform a further number analysis. An example of this is a large corporation that has their own emergency response procedures. In this case, the corporation may choose to re-route a call to a public emergency number such as 112 to their own emergency centre before contacting the appropriate PSAP.

This solution to allowing a UE that has not established a security association with the P-CSCF works in most network scenarios. However, it will not work in a network that handles both fixed and mobile users, because for mobile users using such a network, direct routing is needed to the E-CSCF, in particular for those cases where the user is roaming (due, in part, to regulatory and liability issues). Furthermore, routing emergency sessions via the S-CSCF is not optimal in the case of a fixed access user that is already authenticated, as it requires additional proxy nodes in the path, that during an emergency situation may become a bottle neck that can become overloaded if many users are trying to access the emergency services (as it in general serves many more users than a P-CSCF).

SUMMARY

It is an object of the invention to improve the handling emergency signalling in an IP Multimedia Subsystem network where the User Equipment (UE) has not established a security association with the Proxy Call/Session Control Function (P-CSCF).

According to a first aspect of the invention, there is provided a method of handling emergency signalling in an IP Multimedia Subsystem (IMS) network. A Proxy-Call Session Control Function (P-CSCF) receives a message requesting set up of a session. The message is associated with an IP Multimedia Private Identity (IMPI). The P-CSCF determines that the message relates to an emergency call. If an emergency override tag associated with the IMPI is provisioned or set at the P-CSCF, then the message is forwarding the SIP message to a Serving-Call Session Control Function (S-CSCF) for further handling. However, if an emergency override tag associated with the IMPI is not provisioned or set at the P-CSCF, the message is forwarded to an Emergency-Call Session Control Function (E-CSCF). The invention allows the P-CSCF to exercise a degree of control over the handling of emergency signalling, rather than automatically forwarding the signalling to a S-CSCF in the event that the UE does not have an established security association with the P-CSCF.

As an option, the emergency override tag is provisioned or set in the event that the IMPI is associated with one of a predetermined access network, a predetermined access network type (for example, fixed-line access network), a predetermined authentication method (for example, Digest authentication), and a User Equipment that is not located in a visited network.

As a further option, the emergency override tag for the IMPI is received from the S-CSCF in one of SIP 200 OK message and a SIP NOTIFY message.

According to a second aspect of the invention, there is provided a P-CSCF for use in an IMS network. A receiver is provided for receiving a message associated with an IMPI, the message requesting set up of a session. A determining function is provided for determining that the message relates to an emergency call, and an emergency override function is provided for determining that an emergency override tag associated with the IMPI is provisioned or set at the P-CSCF. A transmitter is also provided. In the event that it is determined that an emergency override tag associated with the IMPI is provisioned or set at the P-CSCF, the transmitter is arranged to forward the message to a S-CSCF to be further handled. In the event that the emergency override tag associated with the IMPI is not provisioned or set at the P-CSCF, the transmitter is arranged to forward the message to an E-CSCF.

The receiver is optionally arranged to receive an emergency override tag for the IMPI registered from a S-CSCF in one of SIP 200 OK message and a SIP NOTIFY message.

According to a third aspect of the invention, there is provided a S-CSCF for use in an IMS network. A first receiver is provided for receiving a registration request from a P-CSCF, the registration request being associated with an IMPI. A first transmitter is provided for sending a query to a Home Subscriber Server (HSS). The query is a request for an emergency override tag associated with the IMPI and stored at the HSS. A second receiver is provided for receiving a response to the query, the response including the emergency override tag associated with the IMPI. A second transmitter is provided for sending a message to the P-CSCF, the message including the emergency override tag associated with the IMPI.

The message sent to the P-CSCF is optionally sent in response to one of the registration request and a user data subscription request.

According to a fourth aspect of the invention, there is provided a HSS for use in an IMS network. The HSS is provided with a memory is for storing an emergency override tag associated with an IMPI, the emergency override tag for use by a P-CSCF in determining where to route emergency signalling. A receiver is also provided for receiving from a S-CSCF a query requesting the emergency override tag. A transmitter is provided for sending a response to the S-CSCF, the response including the emergency override tag.

According to a fifth aspect of the invention, there is provided a computer program comprising computer readable code which, when run on a P-CSCF, causes the P-CSCF to behave as a P-CSCF as described above in the second aspect of the invention.

According to a sixth aspect of the invention, there is provided a computer program comprising computer readable code which, when run on a S-CSCF, causes the S-CSCF to behave as a S-CSCF as described above in the third aspect of the invention.

According to a seventh aspect of the invention, there is provided a computer program comprising computer readable code which, when run on a HSS, causes the HSS to behave as a HSS as described above in the fourth aspect of the invention.

According to an eighth aspect of the invention, there is provided a computer program product comprising a computer readable medium and a computer program as described above in any of the fifth, sixth or seventh aspects of the invention, wherein the computer program is stored on the computer readable medium.

DETAILED DESCRIPTION

Figure 1:
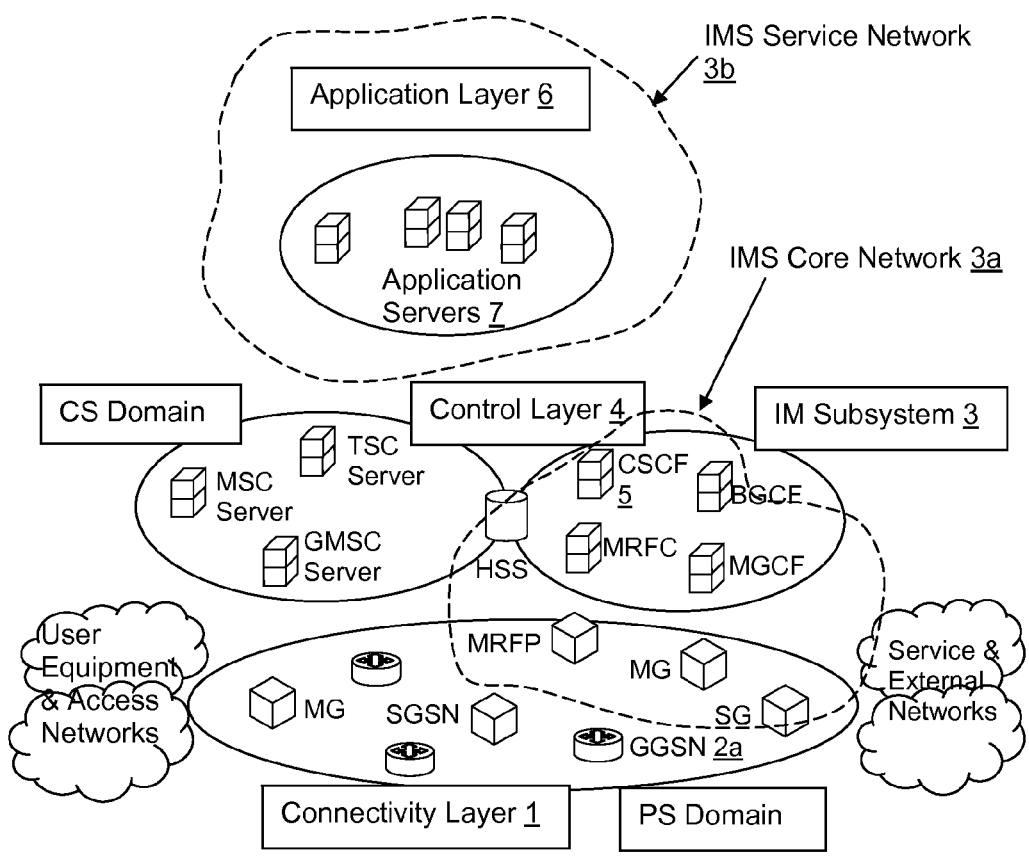
FIG. 1 illustrates schematically in a block diagram an IMS network in association with a mobile network architecture of a General Packet Radio Service (GPRS) access network.
Figure 2:
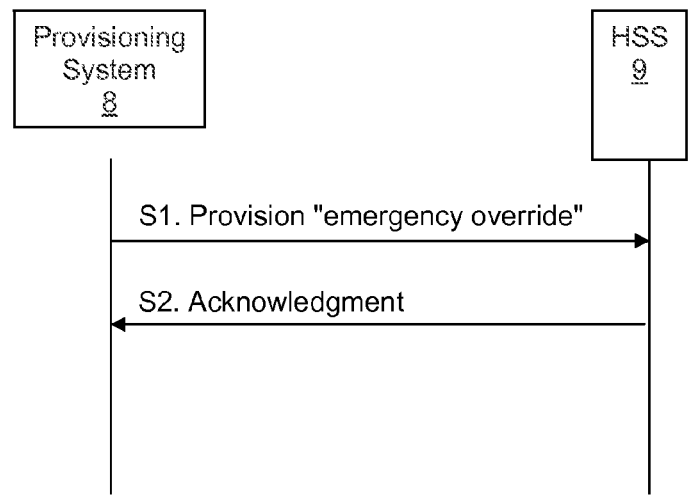
FIG. 2 is a signalling diagram showing the provisioning of a Home Subscriber Server with a P-CSCF emergency override tag according to an embodiment of the invention.

An indicator is associated with a user account, and provisioned in the Home Subscriber Server (HSS). The indicator is subsequently provided to a Proxy-Call Session Control Function (P-CSCF) for use by the P-CSCF in determining where to route emergency signalling. The indicator is referred to herein as an emergency override tag. Referring to FIG. 2, a provisioning system 8 sends (S1) a message to a HSS 9 for provisioning the emergency override tag. The HSS 9 responds (S2) with an acknowledgement.

Figure 3:
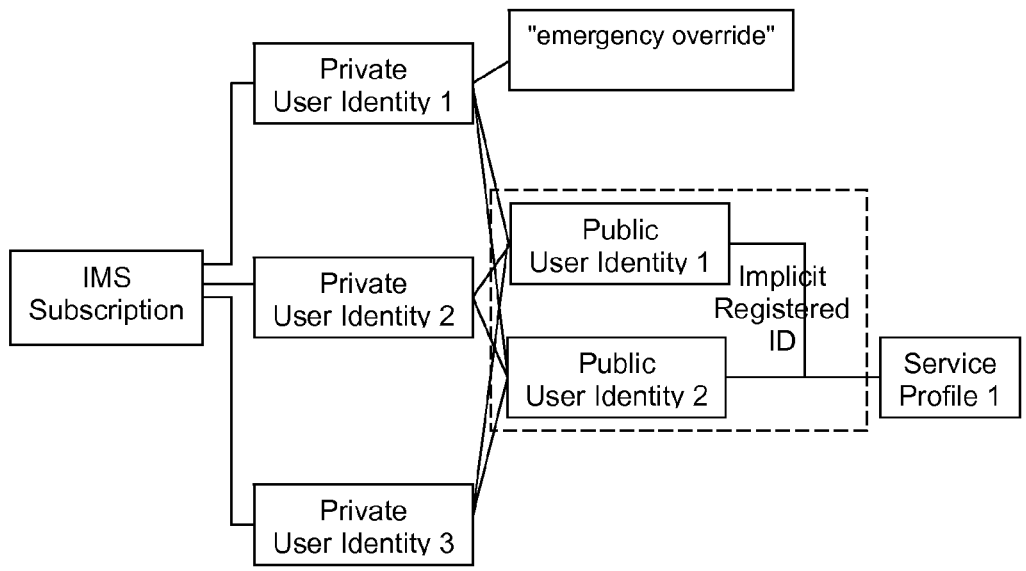
FIG. 3 illustrates schematically in a block diagram an example user subscription with an emergency override tag associated with a private identity.

Referring to FIG. 3, the emergency override tag is this example is associated with IP Multimedia Private Identity (IMPI) 1 provisioned in the HSS 9. The emergency override tag need not be associated with only the Private User Identity 1, but may additionally be associated with a type of authentication method used. For example, if IMPI 1 is provisioned with credentials for both Digest authentication and IMS Authentication and Key Agreement (AKA), the emergency override tag may be set to only be used where the Digest authentication method is used.

Figure 4:
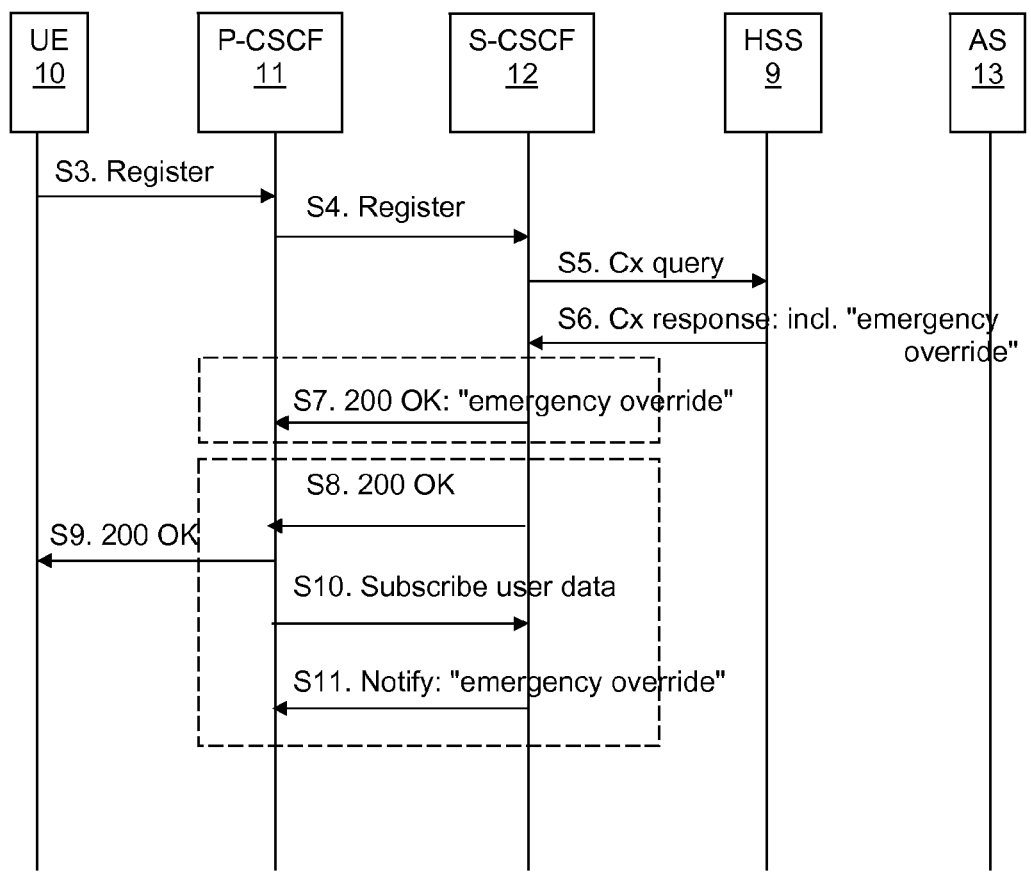
FIG. 4 is a signalling diagram illustrating a registration process according to an embodiment of the invention.

Referring to FIG. 4, there is illustrated a User Equipment (UE) 10, a P-CSCF 11, a Serving-Call Session Control Function (S-CSCF) 12, a HSS 9 and an Application Server 13. During registration of the UE 10, the following steps, with the following numbering corresponding to the numbering of FIG. 3:

S3. The UE 10 sends a Register request to the P-CSCF 11. This is the same for both emergency registration and non-emergency registration.

S4. The P-CSCF forwards the Register request to the S-CSCF 12.

S5. The S-CSCF sends a query to the HSS 9 associated with the user of the UE 10 over the CX interface.

S6. The HSS 9 responds to the query over the Cx interface, the response including the emergency override tag. The emergency override tag is then stored at the S-CSCF for the duration of the user's registration.

The emergency override tag can then be sent to the P-CSCF 11 either in the Registration response (200 OK) message (see steps S7 and S9) or as part of a notification message sent in the event that the P-CSCF 11 subscribes to user data from the S-CSCF 12 (see steps S10 and S11).

S7. In the first alternative, the S-CSCF 12 adds the emergency override tag to a SIP 200 OK message, and sends the SIP 200 OK message to the P-CSCF 11 in response to the Register message (sent in step S4). The P-CSCF then stores the emergency override tag, and removes it from the SIP 200 OK message. The process continues at step S9.

S8. In the second alternative, the S-CSCF 12 sends a SIP 200 OK message to the P-CSCF 11 in response to the Register message (sent in step S4).

S9. The SIP 200 OK message is sent from the P-CSCF 11 to the UE 10.

S10. In the second alternative, the P-CSCF 11 sends a Subscribe request to the S-CSCF 12 to subscribe to user data.

S11. As the S-CSCF 12 has stored the emergency override tag, it includes this in a Notify message and sends the notify message to the P-CSCF 11.

Whether the first or the second alternative is used, the P-CSCF becomes provisioned with the emergency override tag.

The Cx interface between the S-CSCF 12 and the HSS 9 must be extended in order to allow the S-CSCF 12 to request the emergency override tag from the HSS 9. For example, a new attribute/value pair (AVP) may be provided. An example formal of a suitable AVP is as follows:

AVP Format
Emergency-Data-Item::=<AVP Header: 123445567>
 [Emergency-override]

Alternatively, instead of introducing a new AVP, the Emergency-override parameter is included in an existing AVP such as a User Data AVP.

Figure 5:
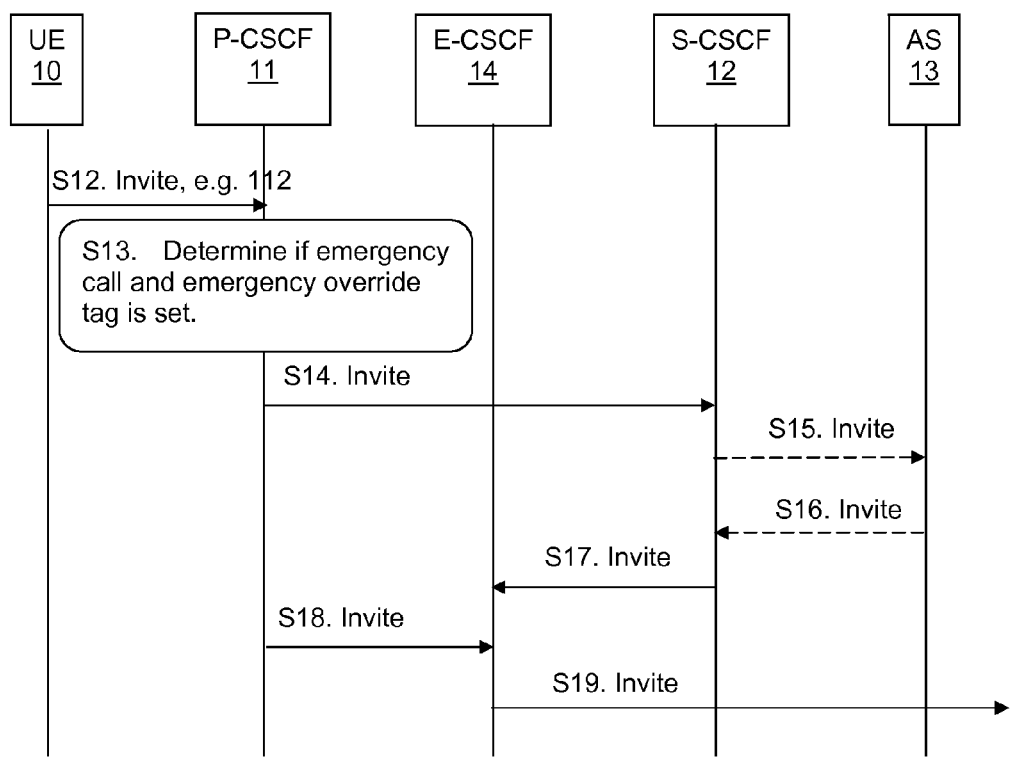
FIG. 5 is a signalling diagram illustrating a call initiation process according to an embodiment of the invention.

When a call is initiated by the UE, and the call is directed to a URI that may be IMS emergency related, e.g., 112, the P-CSCF must determine whether or not to send the call to the S-CSCF 12 or an E-CSCF 14. Call signalling is illustrated in FIG. 5, with the following numbering corresponding to the numbering of FIG. 5:

S12. The UE 10 sends a SIP INVITE to set up the emergency call to the P-CSCF 11.

S13. The P-CSCF 11 determines whether the SIP INVITE is related to an emergency call. This may be done by, for example, provisioning the P-CSCF with URIs and numbers associated with emergency services. If the call is an emergency call, then the P-CSCF determines whether the emergency override tag is present or set. If it is not present, or not set, then the process continues at step S18. It the emergency override tag associated with the IMPI is present and set, then the process continues at step S14.

S14. The SIP INVITE is forwarded from the P-CSCF 11 to the S-CSCF 12. The S-CSCF 12 can then perform a SIP-Digest authentication if required. This step would then result in a challenge towards the user (not shown), before continuing with following steps.

S15. If further number analysis is required by an AS to determine if the call is an emergency call, for instance in the case of an enterprise service, the SIP INVITE is forwarded from the S-CSCF 12 to an AS 13.

S16. The AS 13 makes a routing decision on whether the number is an emergency number that should be routed to the emergency centre. The AS 13 decides that this is the case, and forwards the request onwards to the S-CSCF 12.

S17. The SIP INVITE is then routed from the S-CSCF 12 to the E-CSCF once the SIP-Digest authentication procedure is complete or the AS invocation is completed. The process continues at step S19.

S18. As the emergency override tag is not present or not set, the P-CSCF forwards the SIP INVITE to the E-CSCF 14.

S19. The E-CSCF selects a PSAP (not shown) and forwards the SIP INVITE towards the selected PSAP.

The invention allows an HSS to be provisioned with an emergency override tag associated with an IMPI. This can be sent to the P-CSCF to help the P-CSCF to make a decision regarding routing an emergency call directly to an E-CSCF, or routing an emergency call via an S-CSCF. This is particularly useful when the UE is located in a network that handles both fixed and mobile access. Such a network, using prior art methods, would route all emergency calls via an S-CSCF, but this is unnecessary when the UE is using an authenticated fixed-line access network. Furthermore, routing emergency calls via an S-CSCF is not desirable when a mobile UE is roaming in a network other than the home network at which the S-CSCF is located, as an emergency call should ideally be routed locally in that country to prevent network failures in another (home) country from affecting local emergency calls. The emergency override tag can be set to ensure that an emergency call is not routed via an S-CSCF in the event that the IMPI is associated with a fixed line access, or the UE is not in its home network.

Figure 6:
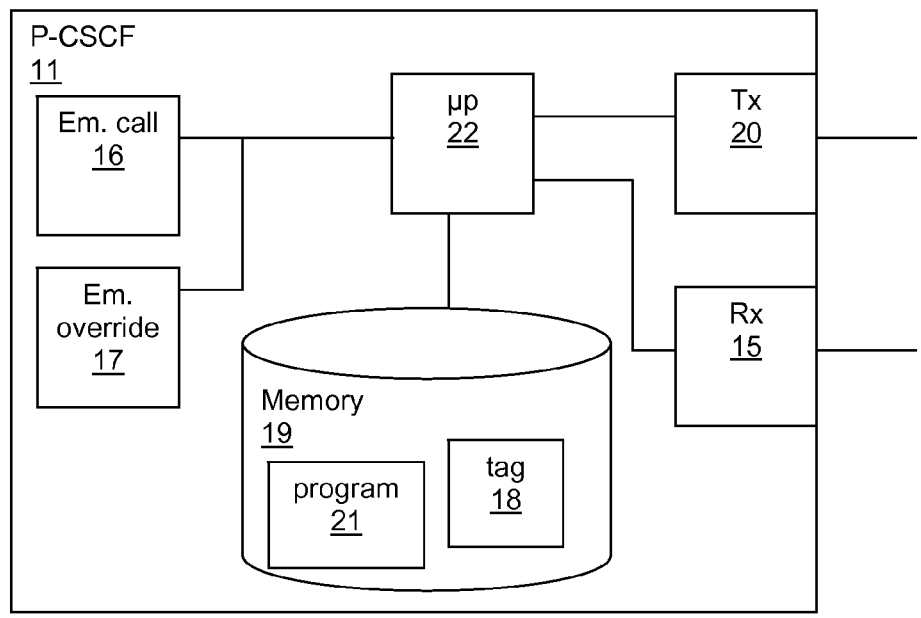
FIG. 6 illustrates schematically in a block diagram a Proxy Call Session Control Function according to an embodiment of the invention.

Referring now to FIG. 6, a P-CSCF 11 is provided with a receiver 15 for receiving a session set up message such as a SIP INVITE, as described in step S12. The receiver 15 may also be arranged to receive the emergency override tag from S-CSCF 12 in either a SIP 200 OK message, or a SIP NOTIFY message, as described in steps S7 and S11 respectively. Of course, this may be performed by a different receiver (not shown) at the P-CSCF 11.

An emergency call determining function 16 is provided for determining that the session set up message relates to an emergency call, for example by comparing a URI in the session set up message with a list of known URIs that relate to emergency services.

An emergency override function 17 is provided for determining that an emergency override tag 18 associated with the IP Multimedia Private Identity is provisioned or set at the P-CSCF 11. The emergency override tag 18 is typically stored in a memory 19.

A transmitter 20 is provided for forwarding the session set up message to either the S-CSCF 12 in the event that the emergency override tag 18 is provisioned and set, or the E-CSCF 14 in the event that the emergency override tag 18 is either not provisioned or not set.

It will be appreciated that different configurations of receiver and transmitter can be used. For example, all the receiver and transmitter described above may be implemented in a single transceiver.

The above description of the P-CSCF 11 assumes a hardware implementation of the invention, although the skilled person will appreciate that certain elements, for example, the emergency call determining function 16 and the emergency override function 17 may be implemented using software. In this case the memory 19 is a computer readable medium in which a computer program 21 is stored, and a processor 22 is provided for running the computer program.

Figure 7:
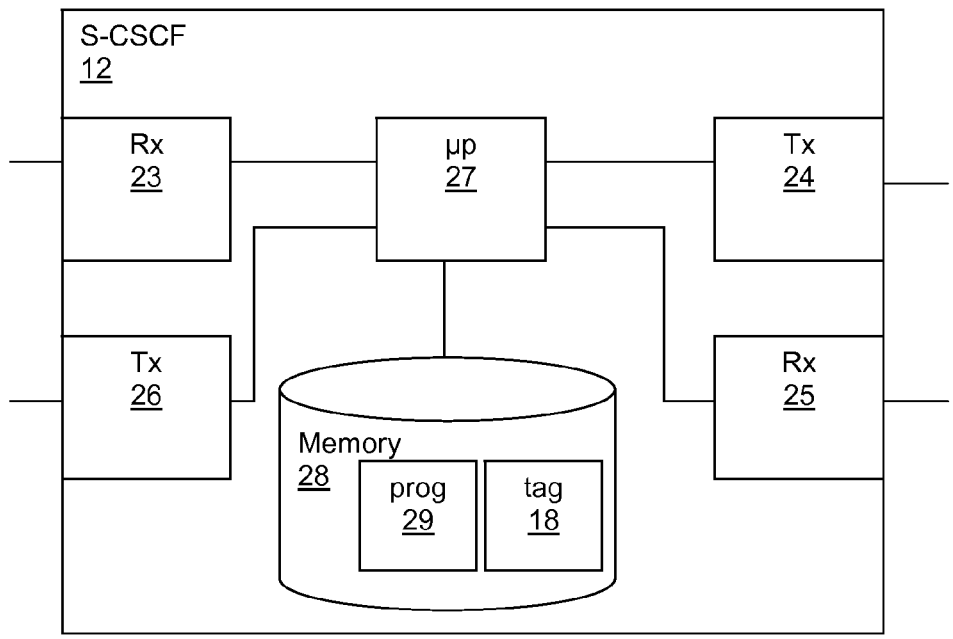
FIG. 7 illustrates schematically in a block diagram a Serving Call Session Control Function according to an embodiment of the invention.

Referring now to FIG. 7, a S-CSCF 12 is provided with a first receiver 23 for receiving a Register request from the P-CSCF 11 as described in step S4. A first transmitter 24 is provided for sending a Cx query to the HSS 9, as described in step S5. A second receiver 25 is provided for receiving the Cx response as described in step S6. A second transmitter 26 is also provided for sending a message to the P-CSCF 11, the message including the emergency override tag 18. The message may be sent to the P-CSCF 11 in response to one of the registration request or a user data may be also provided for storing the emergency override tag 18. A processor 27 is also provided for handling the signalling, and a memory 28 may be provided for storing the emergency override tag 18.

It will be appreciated that different configurations of receiver and transmitter can be used. For example, all of the receivers and transmitters described above may be implemented in a single transceiver.

The above description of the S-CSCF 12 assumes a hardware implementation of the invention, although the skilled person will appreciate that certain elements, such as instructions for handling the signalling, may be implemented using software. In this case the memory 28 is a computer readable medium in which a computer program 29 is stored, which can be run using the processor 27.

Figure 8:
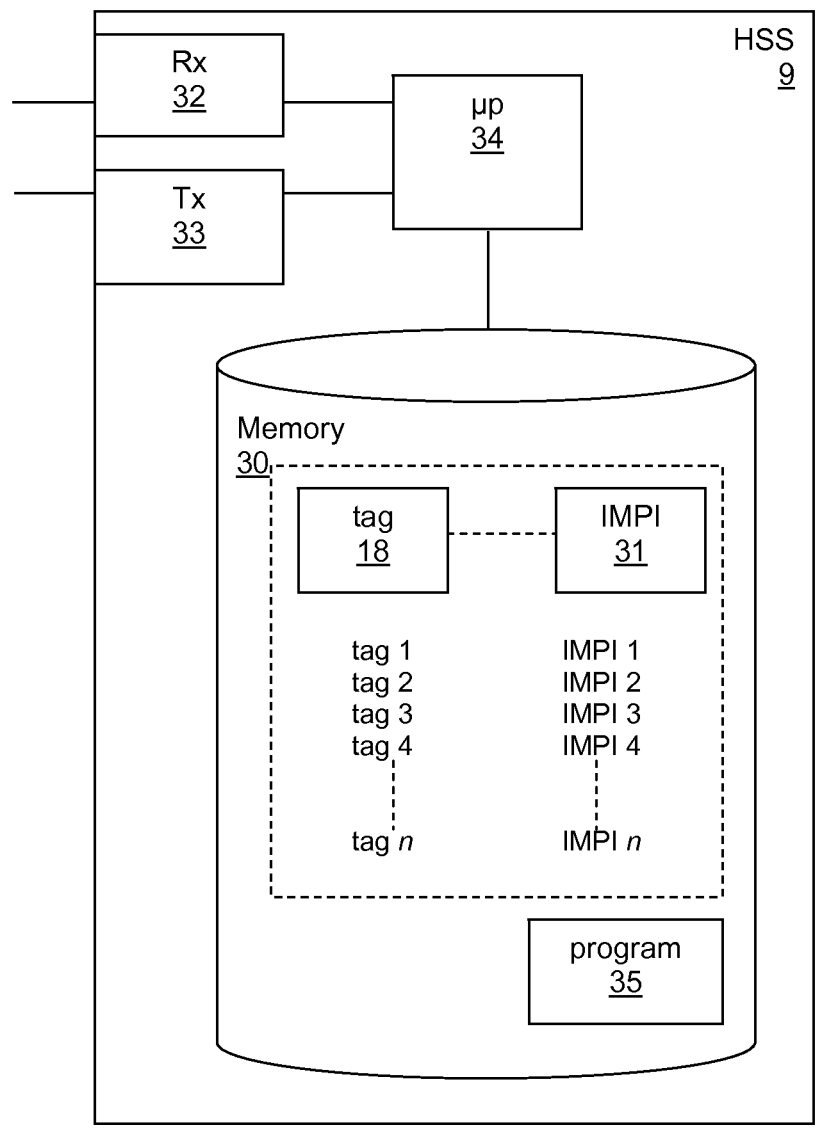
FIG. 8 illustrates schematically in a block diagram a Home Subscriber Server according to an embodiment of the invention.

FIG. 8 illustrates a HSS 9, which is provided with a memory 30 for storing an emergency override tag 18 that is associated with an IMPI 31. Of course, the memory is likely to store IMPIs and emergency override tags for many users. A receiver 32 is provided for receiving a Cx query from the S-CSCF 12, as described in step S5, and a transmitter 33 is provided for responding to the Cx query with the required tag 18. A processor 34 is provided for handling the signalling and obtaining the required information from the memory 30.

The above description of the HSS 9 assumes a hardware implementation of the invention, although the skilled person will appreciate that certain elements may be implemented using software. In this case the memory 30 is a computer readable medium in which a computer program 35 is stored, which can be run using the processor 34. The skilled person will appreciate that different information may be stored in different physical memories at the HSS 9.

It will be appreciated by the person of skill in the art that various modifications may be made to the above-described embodiments without departing from the scope of the invention as defined in the appended claims.

The following acronyms have been used in this description:
3GPP Third Generation Partnership Project
AS Application Server
AVP Attribute-value pair
E-CSCF Emergency-Call Session Control Function
GGSN Gateway GPRS support node
GPRS General Packet Radio Service
GSNs GPRS Support Node
HSS Home Subscriber Server
I-CSCF Interrogating-Call Session Control Function
IMPI IP Multimedia Private Identity
IMS IP Multimedia Subsystem
LRF Location Retrieval Function
P-CSCF Proxy-Call Session Control Function
PSAP Public Safety Answering Point
S-CSCF Serving-Call Session Control Function
SDP Session Description Protocol
SIP Session Initiation Protocol
UE User Equipment

The invention claimed is:

1. A method of handling emergency signaling in an Internet Protocol (IP) Multimedia Subsystem (IMS) network, the method comprising:
   at a Proxy-Call Session Control Function (P-CSCF), receiving a message associated with an IP Multimedia Private Identity, the message requesting a setup of a session;
   at the P-CSCF, determining that the message relates to an emergency call;
   in an event that an emergency override tag associated with the IP Multimedia Private Identity is provisioned at the P-CSCF, forwarding the message to a Serving-Call Session Control Function (S-CSCF), wherein the S-CSCF handles the message and the emergency call; and
   in an event that an emergency override tag associated with the IP Multimedia Private Identity is not provisioned at the P-CSCF, forwarding the message to an Emergency-Call Session Control Function (E-CSCF), wherein the E-CSCF handles the message and the emergency call.

2. The method according to claim 1, wherein the emergency override tag is provisioned in an event that the IP Multimedia Private Identity is associated with one of a predetermined access network, a predetermined access network type, a predetermined authentication method, and a User Equipment that is not located in a visited network.

3. The method according to claim 1, further comprising:
   prior to receiving the message requesting setup of a session, receiving an emergency override tag for the IP Multimedia Private Identity registered from the S-CSCF in one of a SIP 200 OK message and a SIP NOTIFY message.

4. A Proxy-Call Session Control Function (P-CSCF) node for use in an Internet Protocol (IP) Multimedia Subsystem (IMS) network, the P-CSCF node comprising:
   a receiver configured for receiving a message associated with an IP Multimedia Private Identity, the message requesting setup of a session;
   at least one microprocessor;
   a non-transitory computer-readable storage medium, coupled to the at least one microprocessor, comprising computer-readable instructions, when executed by the at least one microprocessor, are configured for:
      determining that the message relates to an emergency call, and
      determining if an emergency override tag associated with the IP Multimedia Private Identity is provisioned at the P-CSCF node; and
   a transmitter configured for, in an event that an emergency override tag associated with the IP Multimedia Private Identity is provisioned at the P-CSCF, forwarding the message to a Serving-Call Session Control Function (S-CSCF), wherein the S-CSCF handles the message and the emergency call, and in an event that an emergency override tag associated with the IP Multimedia Private Identity is not provisioned at the P-CSCF, forwarding the message to an Emergency-Call Session Control Function (E-CSCF), wherein the E-CSCF handles the message and the emergency call.

5. The P-CSCF node according to claim 4, wherein the receiver is configured for receiving an emergency override tag for the IP Multimedia Private Identity registered from a S-CSCF in one of a SIP 200 OK message and a SIP NOTIFY message.

* * * * *